(12) United States Patent
Kulkarni et al.

(10) Patent No.: US 9,058,841 B2
(45) Date of Patent: Jun. 16, 2015

(54) METHOD AND SYSTEM FOR EDITING VIDEO SEQUENCES

(75) Inventors: Girish Kulkarni, Bangalore (IN); Bela Anand, Bangalore (IN); Gunadhar Sareddy, Bangalore (IN); Umamaheswaran Bahusrutham Sridharan, Bangalore (IN); Praveen Saxena, Bangalore (IN); Gaurav Kumar Jain, Bangalore (IN)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 504 days.

(21) Appl. No.: 13/183,649

(22) Filed: Jul. 15, 2011

(65) Prior Publication Data

US 2012/0014662 A1 Jan. 19, 2012

(30) Foreign Application Priority Data

Jul. 15, 2010 (IN) .......................... 2022/CHE/2010
Jun. 8, 2011 (KR) ....................... 10-2011-0055204

(51) Int. Cl.
*H04N 5/93* (2006.01)
*G11B 27/034* (2006.01)

(52) U.S. Cl.
CPC .................................. *G11B 27/034* (2013.01)

(58) Field of Classification Search
None
See application file for complete search history.

(56) References Cited

U.S. PATENT DOCUMENTS

| | | | |
|---|---|---|---|
| 5,917,553 A * | 6/1999 | Honey et al. .................. 348/578 |
| 2006/0026628 A1 * | 2/2006 | Wan et al. ........................ 725/32 |
| 2009/0142030 A1 * | 6/2009 | Lee et al. ......................... 386/52 |
| 2009/0169168 A1 * | 7/2009 | Ishikawa ......................... 386/52 |

* cited by examiner

*Primary Examiner* — Heather Jones
(74) *Attorney, Agent, or Firm* — Cha & Reiter, LLC

(57) ABSTRACT

A method and system for editing video sequences. The method includes playing a first video sequence on a device and introducing one or more objects randomly in the first video sequence. The method further includes determining one or more randomized properties associated with the randomly inserts objects. Moreover, the method includes recording the one or more randomized properties. The system includes a device. The device includes a memory that stores one or more objects and one or more randomized properties associated with the one or more objects; a random generator that introduces the objects randomly from the memory in a first video sequence; and a processor operable to play the first video sequence including randomly introduced objects, determine the one or more randomized properties associated with the one or more objects and to record the one or more randomized properties.

20 Claims, 3 Drawing Sheets

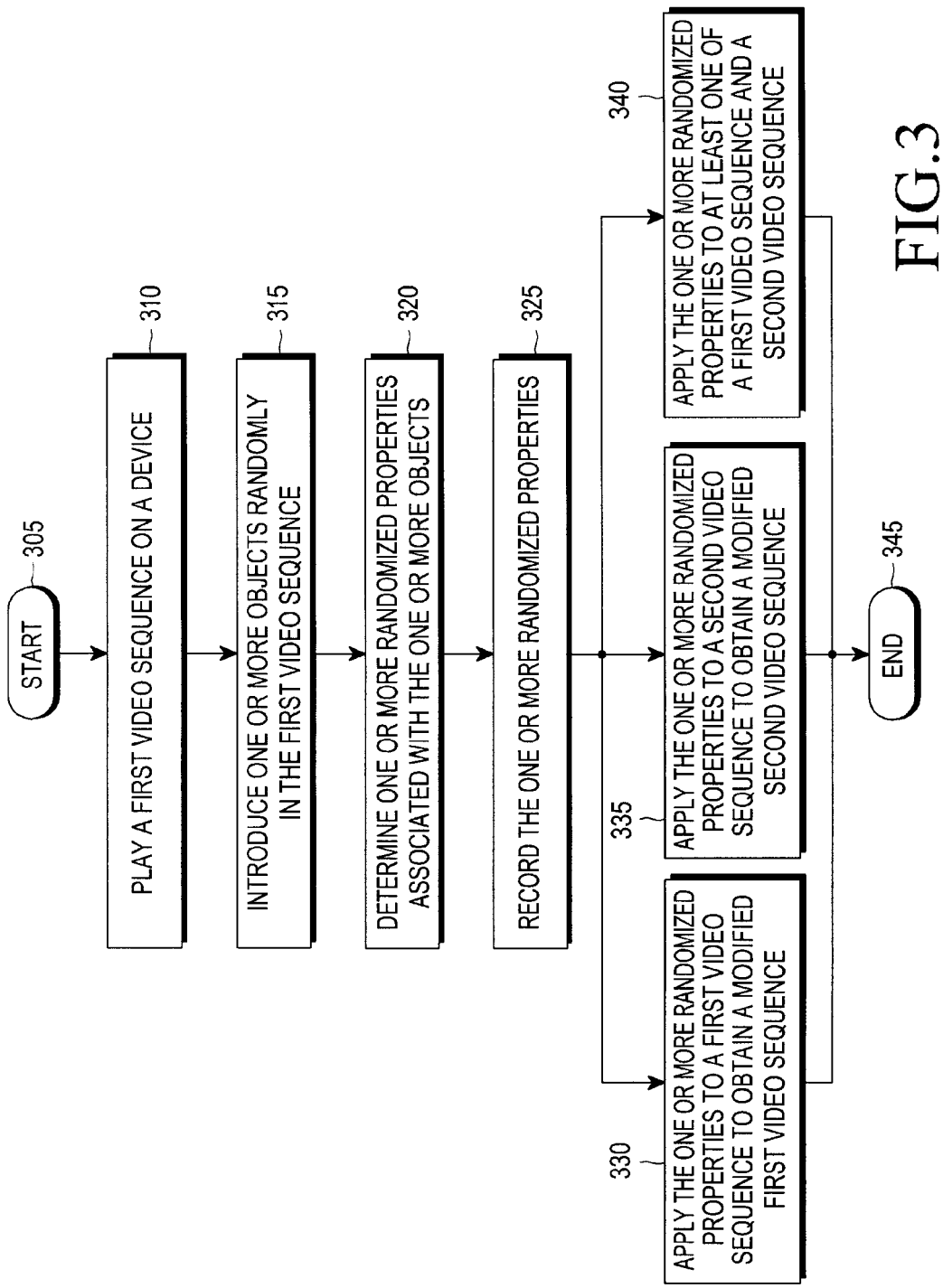

METHOD AND SYSTEM FOR EDITING VIDEO SEQUENCES

CLAIM OF PRIORITY

This application claims, pursuant to 35 U.S.C. §119(a), priority to and the benefit of the earlier filing date of, that patent application filed in the Indian Patent Office on Jul. 15, 2010 and assigned Serial No. 2022/CHE/2010, and of a Korean patent application filed in the Korean Intellectual Property Office on Jun. 8, 2011, and assigned Serial No. 10-2011-0055204, the entire disclosure of each of which is hereby incorporated by reference.

BACKGROUND

1. Field

The present disclosure relates generally to the field of multimedia. More particularly, the present disclosure relates to a method and system for editing video sequences.

2. Background

Often, a user desires to edit a video sequence to create a desired video sequence. Currently existing techniques provide a user options to add or delete content during the editing of the video sequence. Usually, the content that is added is predictable and, thus, creates an uninteresting video sequence as an end result. In some cases, the content needs to be repeatedly added in different frames of the video sequence or another video sequence which is both time consuming and tedious. Further, saving the content as previewed in the video sequence is complex.

In light of the foregoing discussion there is a need for an efficient technique for editing video sequences.

SUMMARY

Embodiments of the present disclosure described herein provide a method and system for editing video sequences.

An example of a method for editing video sequences includes playing a first video sequence on a device. The method also includes introducing one or more objects randomly in the first video sequence. The method further includes determining one or more randomized properties associated with the one or more objects. Moreover, the method includes recording the one or more randomized properties.

An example of a system for editing video sequences includes a device. The device includes a memory that stores one or more objects and one or more randomized properties associated with the one or more objects. The device also includes a random generator that introduces the one or more objects randomly in a first video sequence. Further, the device includes a processor that is operable to play the first video sequence, determine the one or more randomized properties associated with the one or more objects and to record the one or more randomized properties.

BRIEF DESCRIPTION OF FIGURES

The accompanying figures, the same reference numerals refer to identical or functionally same elements. These reference numerals are used in the detailed description to illustrate various embodiments and to explain various aspects and advantages of the present disclosure.

FIG. 3 is a flowchart illustrating a method for editing video sequences, in accordance with a second embodiment of the invention.

Persons skilled in the art will appreciate that elements in the figures are illustrated for simplicity and clarity and may have not been drawn to scale. For example, the dimensions of some of the elements in the figures may be exaggerated relative to other elements to help to improve understanding of various embodiments of the present disclosure.

DETAILED DESCRIPTION

It should be observed that method steps and system components have been represented by conventional symbols in the figures, showing only specific details that are relevant for an understanding of the present disclosure. Further, details that may be readily apparent to person ordinarily skilled in the art may not have been disclosed. In the present disclosure, relational terms such as first and second, and the like, may be used to distinguish one entity from another entity, without necessarily implying any actual relationship or order between such entities.

Embodiments of the present disclosure described herein provide a method and system for editing video sequences.

Figure 1:
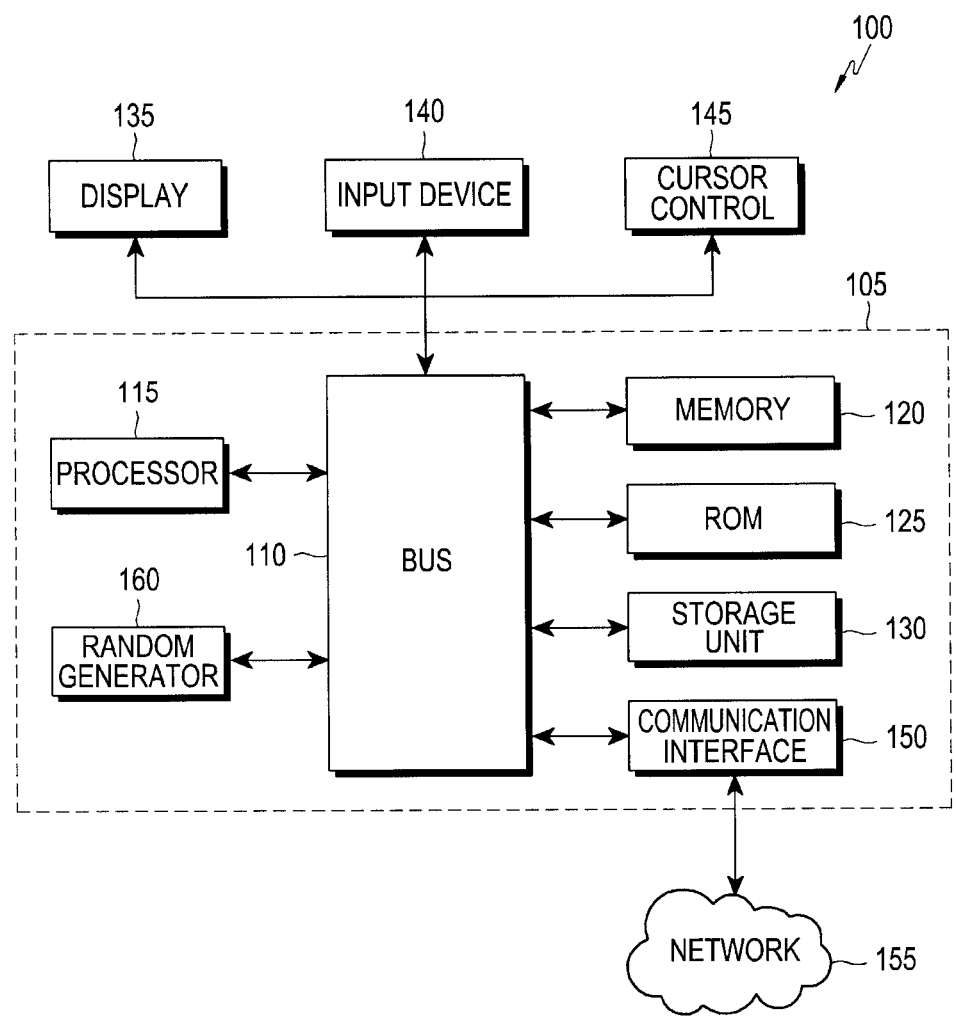
FIG. 1 illustrates a system for editing video sequences, in accordance with one embodiment of the invention.

FIG. 1 illustrates a system 100 for editing video sequences, in accordance with one embodiment. The system 100 includes a device 105. Examples of the device 105 include, but are not limited to, a camcorder, a video player, a digital camera, a computer, a laptop, a mobile device, a digital television, a hand held device, and a personal digital assistant (PDA).

The device 105 includes a bus 110 for communicating information, and a processor 115 coupled with the bus 110 for processing the information. The device 105 also includes a memory 120, for example a random access memory (RAM) coupled to the bus 110 for storing the information required by the processor 115, (e.g., one or more objects and one or more randomized properties associated with the objects). The memory 120 can be used for storing temporary information required by the processor 115. The device 105 further includes a read only memory (ROM) 125 coupled to the bus 110 for storing static information required by the processor 115. A storage unit 130, for example a magnetic disk, hard disk or optical disk, can be provided and coupled to the bus 110 for storing the information.

The device 105 can be coupled via the bus 110 to a display 135, for example a cathode ray tube (CRT), a liquid crystal display (LCD), a light emitting diode display (LED), an organic LED (OLED), and other type of display devices, for displaying information. An input device 140, including various keys, can be coupled to the bus 110 for communicating the information and/or different forms of alphanumeric data, to the processor 115. In some embodiments, a cursor control 145, for example a mouse, a trackball, a joystick, or cursor direction keys for communicating the information and/or cursor position data, to the processor 115 and for controlling cursor movement on the display 135 can also be present.

In some embodiments, the steps of the present disclosure are performed by the device 105 using the processor 115. The information can be read into the memory 120 from a machine-readable medium, for example the storage unit 130. In alternative embodiments, hard-wired circuitry can be used in place of or in combination with software instructions to implement various embodiments.

The term machine-readable medium can be defined as a medium providing data to a machine to enable the machine to perform a specific function. The machine-readable medium can be a storage media. Storage media can include non-volatile media and volatile media. The storage unit 130 can be a non-volatile media. The memory 120 can be a volatile media. All such media must be tangible to enable the instructions carried by the media to be detected by a physical mechanism that reads the instructions into the machine.

Examples of the machine readable medium include, but are not limited to, a floppy disk, a flexible disk, a hard disk, a magnetic tape, a CD-ROM, an optical disk, punch-cards, papertape, a RAM, a PROM, EPROM, and a FLASH-EPROM. The machine readable medium can also include online links, download links, and installation links providing the information to the processor 115.

The device 105 also includes a communication interface 150 coupled to the bus 110 for enabling data communication. Examples of the communication interface 150 include, but are not limited to, an integrated services digital network (ISDN) card, a modem, a local area network (LAN) card, an infrared port, a Bluetooth port, a Zigbee port, and a wireless port. Alternatively, or in addition to, the communication interface 150 provides a two-way data communication coupling to a network 155. For example, the communication interface 150 can be a local area network (LAN) card to provide a data communication connection to a compatible LAN. Wireless links can also be implemented. In any such implementation, the communication interface 150 sends and receives electrical, electromagnetic or optical signals that carry digital data streams representing various types of information. The communication interface 150 can be a universal serial bus port. The device 105 is in electronic communication with other devices through the communication interface 150 and the network 155.

In some embodiments, the processor 115 includes one or more processing units for performing one or more functions of the processor 115. The processor 115 or processing units within processor 115 may be hardware circuitry performing specified functions or may be general purpose computers (processors), which when loaded with software, represent special purpose processors that at least perform the processing shown herein.

In some embodiments of the invention, a first video sequence to be edited by the system 100 may be stored in the storage unit 130. In some embodiments, the device 105 receives the first video sequence via the network 155. The first video sequence can be a live video sequence or a recorded video sequence. The processor 115 is operable to play the video sequences available.

The objects stored in the memory 120 are multimedia objects that can enable creation of a theme in the first video sequence. For example, if the first video sequence is based on a birthday party, the objects can include balloons and candles that create the theme for the first video sequence.

The system 100 includes a random generator 160 that introduces the objects stored in the memory 120 randomly in the first video sequence. The objects can be introduced at a random time and space in the first video sequence. Each of the objects can be introduced in the first video sequence more than once. In some embodiments, the random generator 160 is based on a randomized algorithm, for example a Monte-Carlo algorithm. The objects are introduced in the first video sequence at a size corresponding to the size of the original video sequence associated with the first video sequence.

The processor 115 is operable to determine the randomized properties associated with the objects. The randomized properties can be determined across multiple frames. In some embodiments, the randomized properties of the objects may be determined from randomized properties of the objects in previous frames. The randomized properties of the objects in a subsequent frame may be determined from the randomized properties of the objects in a current frame. Examples of the randomized properties include, but are not limited to, a plurality of position coordinates, an identification of each of the objects, and a plurality of attributes.

The processor 115 records the randomized properties in the memory 120. The processor 115 can also record the randomized properties in a user data area of the first video sequence or in a memory or storage device that is not included in the system 100 but can communicate with the system 100. In some embodiments, the processor 115 applies the randomized properties to a second video sequence. In another embodiment, the processor 115 applies the randomized properties to one or more frames of the first video sequence.

The first video sequence and the second video sequence can be displayed on the display 135. A user of the system 100 can preview a version of the first video sequence as the random generator 160 introduces the objects in the first video sequence. When the user desires to save the theme as seen across the multiple frames of the first video sequence played on the display 135, the objects and the randomized properties associated with the objects are recorded in the memory 120. The recording includes registering the randomized properties of each of the objects in each of the multiple frames along with a corresponding frame number. The randomized properties thus recorded can be used on the first video sequence or the second video sequence at a later stage to create the theme.

In some embodiments, the first video sequence and the second video sequence can be sized equal to respective original video sequences. The original video sequences are the video sequences that are initially recorded on display 135, for example. That is, the first and second video sequences may be sized according to the presentation size of the original video sequence (e.g., resolution, aspect ratio, etc.).

The processor 115 records the randomized properties of the objects introduced in the first video sequence with respect to a size of a respective original video sequence. Further, when the randomized properties are applied to the second video sequence, the randomized properties are saved with respect to the respective original video sequence and then adjusted according to a screen size of the display 135 playing the second video sequence.

The user can preview the first video sequence on the display 135 of a mobile phone and the theme can be created on the first video sequence in the display 135 of the mobile phone. In some other embodiments, the first video sequence and the second video sequence can be sized differently to the respective original video sequences. For example, the user can preview the first video sequence in the display 135, for example a monitor with an aspect ratio 4:3 and the theme can be created on the first video sequence in the display 135, for example an LCD television screen with an aspect ratio 16:9.

Figure 2:
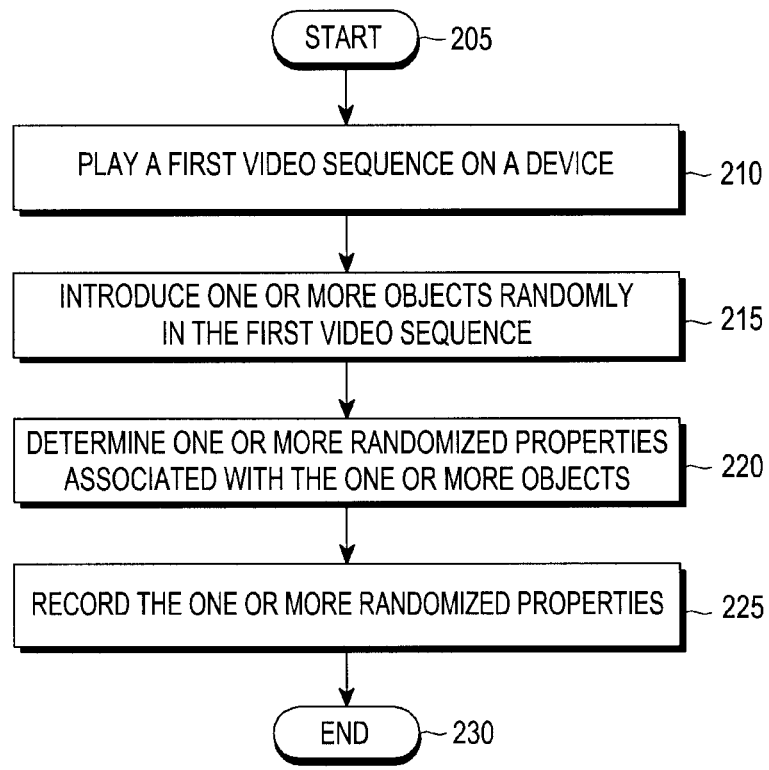
FIG. 2 is a flowchart illustrating a method for editing video sequences, in accordance with the embodiment shown in FIG. 1.

FIG. 2 is a flowchart illustrating a method for editing video sequences, in accordance with one embodiment.

The method starts at step 205.

At step 210, a first video sequence is played on a device that enables video.

At step 215, one or more objects are introduced randomly in the first video sequence. The objects can be selected or generated from a memory. Information associated with each of the objects may also be stored in the memory. Examples of the information include, but are not limited to, a shape, a size, and a colour of each of the objects. The objects may be represented as metadata that summarizes the properties of the objects. The objects are further introduced in a random space and time in the first video sequence by the random generator (i.e., the random generator generates a random number that is used by a processor to position and/or orientate an attribute of the object with one or more frames of the first video sequence.

At step 220, one or more randomized properties associated with the objects are determined. The randomized properties can be determined across multiple frames. Further, the randomized properties associated with the objects can be determined based on randomized properties of the objects in previous frames. Examples of the randomized properties include, but are not limited to, a plurality of position coordinates of each of the objects in each of the subsequent frames, an identification (ID) of each of the objects, and a plurality of attributes of each of the objects. The attributes of each of the objects are determined and recorded along with a corresponding frame number. Examples of the attributes include, but are not limited to, a movement about a random axis, a frame of reference, time stamps, and a plurality of dependency properties.

Examples of the dependency properties include, but are not limited to, properties that represent a relation between time or space occurrence of the objects in each frame of the multiple frames.

In some embodiments, the objects occupy random space in a first frame of the multiple frames. The random space can be defined in terms of the position coordinates, for example an X-axis coordinate and a Y-axis coordinate. An X-axis and a Y-axis form the frame of reference. In a second frame of the multiple frames, the frame of reference can occupy a position different from a position of the frame of reference in the first frame. Hence, the position coordinates and the frame of reference are random in space.

At step 225, the randomized properties of each of the objects in each of the multiple frames are recorded in the memory along with corresponding frame numbers, as shown in Table 1. The randomized properties can be represented as Property 1 to Property N. Each row of the Table 1 corresponds to an occurrence of each of the objects in the multiple frames. For example, if an object with ID A1 appears in one of the multiple frames with a frame number 21, the X-axis coordinate and the Y-axis coordinate of the object and the randomized properties of the object are registered along with the frame number 21 and the object ID A1 in one row of the Table 1.

TABLE 1

| Frame No | X-axis coordinate | Y-axis coordinate | Object ID | Property 1 | Property 2 | ... | Property N |
|---|---|---|---|---|---|---|---|

The randomized properties can also be applied to a second video sequence. The randomized properties are thus replicated in the second video sequence as previewed in the first video sequence. In some embodiments, the randomized properties can also be applied to one or more subsequent frames of the first video sequence.

The first video sequence and the second video sequence can be sized equal to respective original video sequences. The original video sequences are the video sequences that are initially recorded according to a size of a display of a first device that enables video. The randomized properties of the objects introduced in the first video sequence are recorded with respect to the size of a respective original video sequence. Further, when the randomized properties are applied to the second video sequence, the randomized properties are saved with respect to the respective original video sequence and are then adjusted according to the size of the display playing the second video sequence.

The first video sequence can be previewed in a display of the first device that enables video. The randomized properties of the objects in the first video sequence can be applied to the first video sequence played in a display of a second device that enables video. The display of the first device and the display of the second device can be equal or different in size. If the size of the display of the second device is different from the size of the display of the first device, the position coordinates of the objects and the frame of reference are adjusted in space according to the size of the display of the second electronic device.

In some embodiments, the first video sequence and the second video sequence are each one of a live video sequence and a recorded video sequence.

The method stops at step 230.

FIG. 3 is a flowchart illustrating a method for editing video sequences in accordance with a second embodiment of the invention.

The method starts at step 305.

At step 310, a first video sequence is played on a device. The first video sequence can be one of a live video sequence and a recorded video sequence.

At step 315, one or more objects are introduced randomly in the first video sequence. The objects can be selected or generated from a memory.

At step 320, one or more randomized properties associated with the one or more objects are determined. Examples of the randomized properties include, but are not limited to, a plurality of position coordinates of each of the objects in each of the subsequent frames, an identification (ID) of each of the objects, and a plurality of attributes of each of the objects. The attributes of each of the objects are determined and recorded along with a corresponding frame number. Examples of the attributes include, but are not limited to, a movement about a random axis, a frame of reference, time stamps, and a plurality of dependency properties.

At step 325, the one or more randomized properties are recorded in the memory along with corresponding frame numbers.

At step 330, the one or more randomized properties can be applied to the first video sequence to obtain a modified first video sequence. In some embodiments, the randomized properties can also be applied to one or more subsequent frames of the first video sequence. At step 335, the one or more randomized properties can be applied to a second video sequence to obtain a modified second video sequence. The randomized properties are thus replicated in the second video sequence as previewed in the first video sequence. The second video sequence can be either a recorded video sequence or a live video sequence. In some embodiments, the one or more randomized properties can be applied to the first video sequence, or the second video sequence, or both, at step 340.

In some embodiments, the first video sequence and the second video sequence can be sized equal to respective original video sequences. In other embodiments, the first video sequence and the second video sequence can be sized different to respective original video sequences.

The method stops at step 345.

The above-described methods according to the present invention can be realized in hardware or as software or computer code that can be stored in a recording medium such as a CD, a ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

In the preceding specification, the present disclosure and its advantages have been described with reference to specific embodiments. However, it will be apparent to a person of ordinary skill in the art that various modifications and changes can be made, without departing from the scope of the present disclosure, as set forth in the claims below. Accordingly, the specification and figures are to be regarded as illustrative examples of the present disclosure, rather than in restrictive sense. All such possible modifications are intended to be included within the scope of the present disclosure.

What is claimed is:

1. A method for editing video sequences, the method comprising:
    inserting an object into each one of a plurality of video frames in a first video sequence to generate a modified first video sequence, the object being inserted based on at least one random number, the random number being used to at least one of position and orient the object in one or more of the video frames in the plurality;
    after the object is inserted into each one of the plurality of video frames, identifying an attribute of the object across the plurality of video frames;
    creating a record of the attribute, the record identifying at least one of the plurality of video frames and the attribute; and
    displaying, at least one of the first video sequence and a second video sequence based on the record, the displaying including inserting the object into the at least one of the first video sequence and the second video sequence based on the record.

2. The method of claim 1, wherein the attribute includes a frame of reference of the object.

3. The method of claim 1, wherein the attribute includes an axis of a movement of the object.

4. The method of claim 1, wherein the attribute includes a dependency property that represents a relationship between a location and a time at which the object appears in the first video sequence.

5. The method of claim 1, wherein the random number is generated by a random generator that operates in accordance with a randomized algorithm.

6. The method of claim 1, wherein the record includes a data structure that relates, for each one of the plurality of video frames, a first identifier for the object with a second identifier for the video frame and an indication of the object's attribute.

7. The method of claim 6, wherein the displaying includes displaying the second video sequence, the method further comprising:
    displaying a theme preview, the theme preview including the modified first video sequence;
    receiving an input indicating that a user wishes to store the previewed theme; and
    storing the theme in response to the input, wherein storing the theme includes storing the record in a memory;
    wherein the object is included in the second video sequence based on the record prior to the second video sequence being displayed.

8. The method of claim 6, further comprising adjusting the attribute of the object based on at least one of a resolution and an aspect ratio of the second video sequence, the adjusting being performed before the second video sequence is modified to include the object.

9. The method of claim 8, wherein the inserting is performed while the first video sequence is being played live.

10. The method of claim 1, wherein the object includes an image of a decorative graphic.

11. A device for editing video sequences, the device comprising a processor configured to:
    insert an object into each one of a plurality of video frames in a first video sequence to generate a modified first video sequence, the object being inserted based on at least one random number, the random number being used to at least one of position and orient the object in one or more of the video frames in the plurality;
    after the object is inserted into each one of the plurality of video frames, identify an attribute of the object across the plurality of video frames;
    create a record of the attribute, the record identifying at least one of the plurality of video frames and the attribute; and
    display at least one of the first video sequence and a second video sequence based on the record, the displaying including inserting the object into the at least one of the first video sequence and the second video sequence based on the record.

12. The device of claim 11, wherein the attribute includes a frame of reference of the object.

13. The device of claim 11, wherein the attribute includes an axis of a movement of the object.

14. The device of claim 11, wherein the attribute includes a dependency property that represents a relationship between a location and a time at which the object appears in the first video sequence.

15. The device of claim 11, wherein the random number is generated by a random generator that operates in accordance with a randomized algorithm.

16. The device of claim 15, wherein the record includes a data structure that relates, for each one of the plurality of video frames, a first identifier for the object with a second identifier for the video frame and an indication of the object's attribute.

17. The device of claim 16 further comprising a memory, wherein wherein the displaying includes displaying the second video sequence and the processor is further configured to:
    display a theme preview, the theme preview including the modified first video sequence;
    receive an input indicating that a user wishes to store the previewed theme;
    store the theme in response to the input, wherein storing the theme includes storing the record in the memory; and wherein the object is included in the second video sequence based on the record prior to the second video sequence being displayed.

18. The device of claim 16, wherein the processor is further configured to adjust the attribute of the object based on at least one off resolution and an aspect ratio of the second video sequence, the adjusting being performed before the second video sequence is modified to include the object.

19. The device of claim 18, wherein the inserting is performed while the first video sequence is being played live.

20. The device of claim 11, wherein the object includes an image of a decorative graphic.

* * * * *

UNITED STATES PATENT AND TRADEMARK OFFICE
CERTIFICATE OF CORRECTION

PATENT NO. : 9,058,841 B2  Page 1 of 1
APPLICATION NO. : 13/183649
DATED : June 16, 2015
INVENTOR(S) : Girish Kulkarni et al.

It is certified that error appears in the above-identified patent and that said Letters Patent is hereby corrected as shown below:

In the Claims

Column 8, Claim 17, Lines 57-58 should read as follows:
--...memory, wherein the displaying...--

Column 9, Claim 18, Line 6 should read as follows:
--...one of a resolution...--

Signed and Sealed this
Twenty-ninth Day of September, 2015

Michelle K. Lee
*Director of the United States Patent and Trademark Office*